United States Patent
Xie et al.

(10) Patent No.: US 7,821,454 B2
(45) Date of Patent: Oct. 26, 2010

(54) SYSTEMS AND METHODS FOR DETECTING GPS MEASUREMENT ERRORS

(75) Inventors: Gang Xie, Fullerton, CA (US);
Mangesh Chansarkar, Irvine, CA (US);
Daniel Liao, Irvine, CA (US);
Xiangdong Lin, Irvine, CA (US)

(73) Assignee: SiRF Technology, Inc., San Jose, CA (US)

( * ) Notice: Subject to any disclaimer, the term of this patent is extended or adjusted under 35 U.S.C. 154(b) by 195 days.

(21) Appl. No.: 11/942,912

(22) Filed: Nov. 20, 2007

(65) Prior Publication Data

US 2009/0128407 A1    May 21, 2009

(51) Int. Cl.
G01S 19/20   (2010.01)
G01S 19/21   (2010.01)
G01S 19/22   (2010.01)

(52) U.S. Cl. ............................. 342/357.58; 342/357.59; 342/357.61

(58) Field of Classification Search ............ 342/357.06, 342/357.08, 357.12, 357.15, 357.02
See application file for complete search history.

(56) References Cited

U.S. PATENT DOCUMENTS

| | | | |
|---|---|---|---|
| 6,018,818 A * | 1/2000 | Sheynblat | 714/811 |
| 6,411,892 B1 | 6/2002 | Van Diggelen | |
| 6,417,801 B1 | 7/2002 | Van Diggelen | |
| 6,429,814 B1 | 8/2002 | Van Diggelen et al. | |
| 6,453,237 B1 | 9/2002 | Fuchs et al. | |
| 6,484,097 B2 | 11/2002 | Fuchs et al. | |
| 6,487,499 B1 | 11/2002 | Fuchs et al. | |
| 6,510,387 B2 | 1/2003 | Van Diggelen | |
| 6,542,820 B2 | 4/2003 | LaMance et al. | |
| 6,560,534 B2 | 5/2003 | Abraham et al. | |
| 6,606,346 B2 | 8/2003 | Abraham et al. | |
| 6,704,651 B2 | 3/2004 | Van Diggelen | |
| 2002/0015532 A1 * | 2/2002 | Kostrzewski et al. | 382/243 |
| 2005/0018795 A1 * | 1/2005 | Studenny et al. | 375/343 |
| 2006/0126454 A1 * | 6/2006 | Serrano et al. | 369/44.13 |

* cited by examiner

Primary Examiner—Thomas H Tarcza
Assistant Examiner—Cassi Galt
(74) Attorney, Agent, or Firm—Thomas, Kayden, Horstemeyer & Risley, LLP (57) ABSTRACT

Systems and methods for detecting global positioning system (GPS) measurement errors are provided. In this regard, a representative system, among others, includes a navigation device that is configured to receive GPS signals from signal sources, the navigation device being configured to calculate pseudoranges (PRs) and delta ranges (DRs) based on the received GPS signals, the navigation device including a consistency check algorithm that is configured to: determine mismatches between the respective calculated PRs and DRs, and indicate that an error exists in the respective calculated PRs and DRs based on their mismatch and mismatch accumulations. This algorithm can be independent of navigation state and is capable of detecting slow-changing errors.

13 Claims, 9 Drawing Sheets

The measurement is good if $|(PR_k - PR_{k-1}) - DR_k| <$ Threshold1

San Francisco Urban Canyon
PRN 19, Elevation = 32°

| tow /705 | cn0 | prres | tit | pr /710 | dpr /715 | dr /720 | ddr | dprdr /725 |
|---|---|---|---|---|---|---|---|---|
| 327656 | 26.70 | 10.13 | 30000 | 42351967.8 | 18251.1 | 18243.7 | 1.7 | 7.4 |
| 327657 | 26.80 | 10.44 | 30000 | 42370214.6 | 18246.8 | 18244.4 | 0.7 | 2.4 |
| 327658 | 26.90 | 6.66 | 30000 | 42388459.8 | 18245.2 | 18245.4 | 1.0 | -0.2 |
| 327659 | 22.00 | 172.21 | 800 | 42406863.9 | 18404.1 | 18234.5 | -10.9 | 169.6 |
| 327660 | 20.40 | 155.65 | 1800 | 42425094.5 | 18230.6 | 18234.4 | -0.1 | -3.8 |
| 327661 | 18.90 | 132.82 | 2800 | 42443321.9 | 18227.4 | 18234.9 | 0.5 | -7.5 |

Pseudorange Error based on its reference trajectory $PR_k - PR_{k-1}$ $DR_k - DR_{k-1}$

SYSTEMS AND METHODS FOR DETECTING GPS MEASUREMENT ERRORS

TECHNICAL FIELD

The present disclosure is generally related to navigation and, more particularly, is related to systems and methods for detecting global positioning system (GPS) measurement errors.

BACKGROUND

The global positioning system (GPS) is a satellite-based radio navigation system. In the GPS system, each GPS satellite, also called "space vehicle" (SV), broadcasts time-tagged ranging signals and navigation data. A GPS receiver tracks the satellites whose signals are within its field of view. From these visible satellites, a GPS receiver extracts the navigation data and obtains range measurements from its received GPS satellite signals. The range measurements are used in a navigation solution to calculate a position fix of the GPS receiver.

The GPS navigation data contain, but are not limited to, satellite ephemeris, where ephemeris parameters can be used to accurately calculate satellite position and velocity. In addition to knowing the satellite position, the GPS receiver receives the range measurement to the satellite in order to calculate the position fix. Range measurements include, but are not limited to, two types of measurements—pseudorange (PR) and delta range (DR).

A pseudorange is the apparent distance from the GPS receiver to the satellite. It is calculated by multiplying the speed of light by the apparent transit time, which is the time difference between a signal reception time based on a receiver clock and a signal transmission time based on a satellite clock. This range is termed pseudorange since the receiver clock is not synchronized with the satellite clock and thus the measured range is not necessarily the true range.

A second type of range measurement that is used to calculate the position (including velocity) fix is the DR. DR is a range change rate in unit of meters per second or Doppler. Doppler measurement is a function of a relative velocity, and a relative frequency clock drift between the satellite and the GPS receiver. Accumulated DR (ADR) measurement is also called carrier phase measurement or integrated Doppler measurements in the GPS field. The Doppler or DR measurement allows the receiver to calculate a receiver velocity and a receiver frequency clock drift rate, from which a new position fix can then be obtained if a previous position is known.

To achieve accuracy and integrity, the GPS receiver typically includes algorithms that contain some failure detection and exclusion (FDE) functions to detect and exclude failed range measurements. GPS measurements can be affected by multipath signals, where the GPS signals reflect off, for example, surrounding terrain, buildings, canyon walls, and hard ground, among others. When a signal is reflected, the signal typically passes through a longer path than the corresponding direct-path signal. Thus, the multipath signal can affect the pseudorange measurements, resulting in potential unexpected positive or negative errors. When direct-path signal is blocked, then multipath can make pseudorange measurements erroneously longer. Accordingly, pseudorange residuals, also known as, innovations or errors, can be referred to as a pseudorange measurement minus an estimated range. Many FDE functions can determine whether the pseudorange measurements are normal or failures based typically on the magnitude of the pseudorange residuals. It should be noted that since one pseudorange measurement is typically converted to a corresponding pseudorange residual in navigation algorithms, these two terms sometimes can be exchanged. For example, processing pseudorange measurement residual has the same meaning as processing pseudorange measurement. The two terms will be or become apparent to one with skill in the art upon examination of the following drawings and detailed description.

A large pseudorange residual typically indicates a failure or a potential failure. The FDE function can either exclude or de-weight the failed measurements in the navigation computation. However, the FDE algorithms have a certain probability of false alarms (Pfa), such as, for example, mistakenly excluding good measurements, and a certain probability of misdetections (Pmd), such as, for example, failing to detect bad measurements. Excluding measurements can adversely affect satellite geometry distribution or, in other words, dilution of position (DOP), which, in turn, can magnify measurement errors into position solution errors. In addition, excluding a pseudorange measurement among only three or four available pseudorange measurements can reduce GPS availability.

As mentioned above, many FDE algorithms determine the quality of a measurement based on its corresponding residual, which is the measurement minus an estimated measurement. However, an estimated range is the distance between a satellite position, which can be precisely computed based on its ephemeris, and a receiver position, which generally refers to a GPS fix. However, in tough environments and/or in any cases when a receiver previously performed badly, the previous GPS fix of the receiver position can be inaccurate as well as the estimated range residuals. In other words, range residuals are calculated based on previously estimated receiver position, and therefore the accuracy of range residuals also depends on the accuracy of GPS position fixes. In addition, though many FDE algorithms are effective in detecting spike errors, they are not effective in detecting slow-change errors.

SUMMARY

Systems and methods for detecting global positioning system (GPS) measurement errors are provided. In this regard, a representative system, among others, includes a navigation device that is configured to receive GPS signals from signal sources, the navigation device being configured to calculate pseudoranges (PRs) and delta ranges (DRs) based on the received GPS signals, the navigation device including a consistency check algorithm that is configured to: determine mismatches between the respective calculated PRs and DRs, and indicate that an error exists in the respective calculated PRs and DRs based on at least one of the mismatches.

A representative method, among others, for detecting GPS measurement errors includes receiving GPS signals from signal sources; calculating pseudoranges (PRs) and delta ranges (DRs) based on the received GPS signals; determining mismatches between the respective calculated PRs and DRs; and responsive to determining that the at least one of the mismatches exceeded the mismatch threshold, indicating that an error exists in the respective calculated PRs and DRs based on at least one of the mismatches.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which GPS measurement errors are detected.

Figure 1:
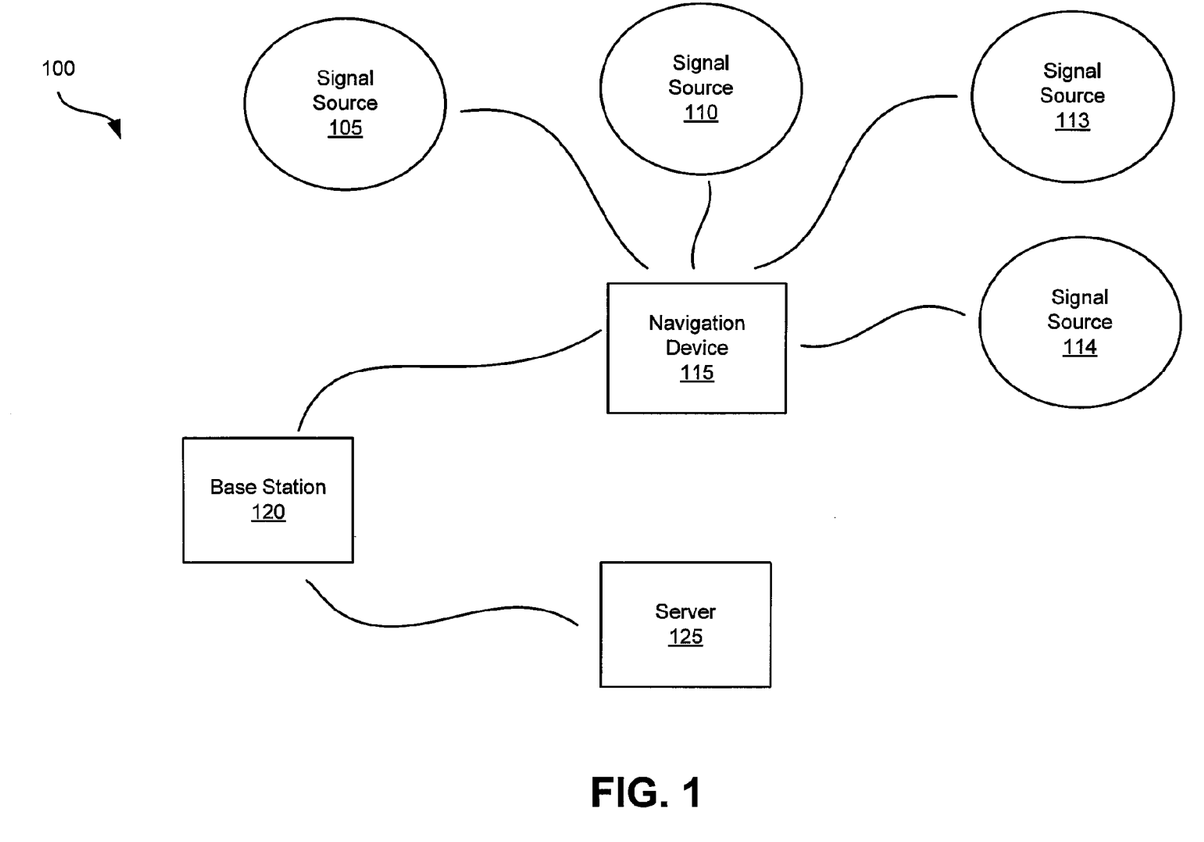
FIG. 1 is a block diagram that illustrates a system for detecting GPS measurement errors.

FIG. 1 is a block diagram that illustrates a system 100 for synthesizing GPS measurements. A simple system 100 comprises a plurality of signal sources 105, 110, 113, 114 and a navigation device 115. Alternatively or additionally, a more complex system 100, such as an assisted global positioning system (AGPS), further comprises a base station 120 and a server 125. Although only one navigation device 115, one base station 120, and one server 125 are shown in system 100, the system 100 can include multiple navigation devices, multiple base stations and/or multiple servers. Alternatively or additionally, the server 125 may be co-located with the base station 120 or with the navigation device 115.

The signal sources 105, 110, 113, 114 include GPS satellites (also known as space vehicles), among others. The signal sources 105, 110, 113, 114 generally orbit above the location of the navigation devices 115 at any given time. The navigation devices 115 include, but are not limited to, GPS receivers, cell phones with embedded signal receivers, and Personal Digital Assistants (PDAs) with embedded signal receivers, among others. The signal sources 105, 110, 113, 114 transmit signals to the navigation devices 115, which use the signals to calculate GPS measurements and determine the location, speed, and direction of the navigation devices 115. Alternatively or additionally, the navigation devices 115 can detect errors in the GPS measurements before the GPS measurements are used to determine the location, speed, and direction of the navigation devices 115. Operations for detecting the GPS measurement errors are described in relation to FIGS. 5 and 6.

Figure 2:
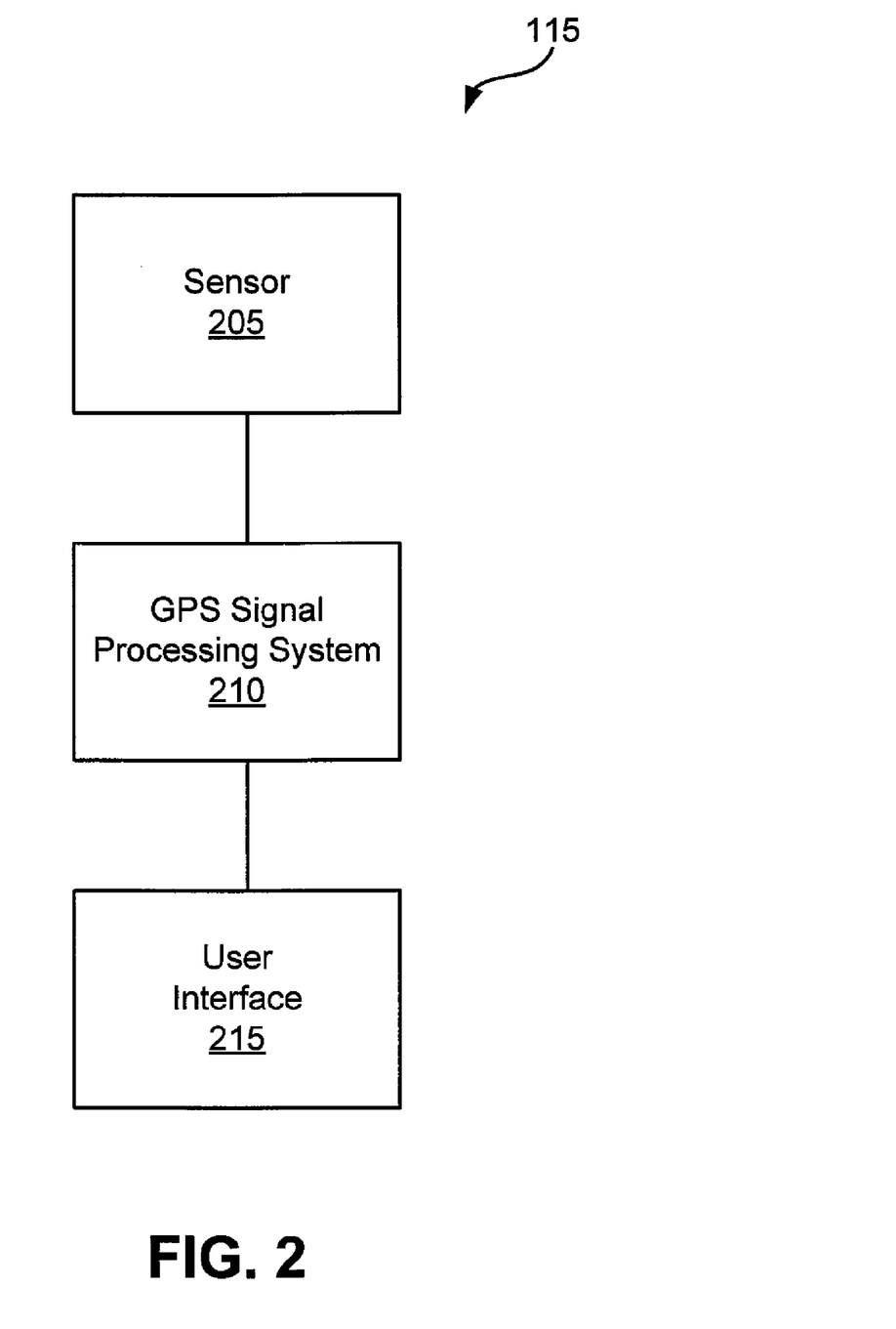
FIG. 2 is a block diagram that illustrates an embodiment of a navigation device 115, such as that shown in FIG. 1.

FIG. 2 is a block diagram that illustrates an embodiment of the navigation device 115, such as that shown in FIG. 1. The navigation device 115 includes, but is not limited to, sensor(s) 205, a GPS signal processing system 210, and a user interface 215. It should be noted that the sensor 205 may not be included in some navigation devices 115. The sensor 205 can include, but is not limited to, inertial sensors that include, for example, micro-electromechanical system (MEMS) sensors, such as, for example, accelerometers and gyroscopes, among others. In general, accelerometers measure acceleration of their vehicle, and gyroscope measures orientation or angular rate of the vehicle.

The GPS signal processing system 210 can include, but is not limited to, a GPS receiver, among others. The navigation device 115 can utilize the sensors 205 and the GPS signal processing system 210 to sense movement of the vehicle. The GPS signal processing system 210 can use data generated by the sensors 205 in dead reckoning calculations to produce positioning information during periods of GPS outages. The positioning information includes data related to the position, velocity, and attitude of a vehicle. In general, dead reckoning refers to a process of calculating location by integrating measured increments of distance and direction of travel relative to a known location. The GPS signal processing system 210 can further include an extended Kalman filter (EKF), which estimates position, velocity, attitude, and accelerometer and gyro errors in three dimensions, such as, for example, the position (X, Y, and Z) and velocity (Vx, Vy, and Vz) of the vehicle, among others. The estimated information is passed to a user interface 215 that provides a user with navigational information.

The GPS signal processing system 210 receives GPS signals from the signal sources 105, 110, 113, 114 (FIG. 1) and calculate GPS measurements that are utilized to determine the location, speed, and direction of the navigation devices 115. Alternatively or additionally, the GPS signal processing system 210 can detect errors in the calculated GPS measurements to avoid calculating a poor position fix. The GPS signal processing system 210 is described in detail in relation to FIG. 3. Operations for detecting the GPS measurement errors are described in relation to FIGS. 5 and 6.

Figure 3:
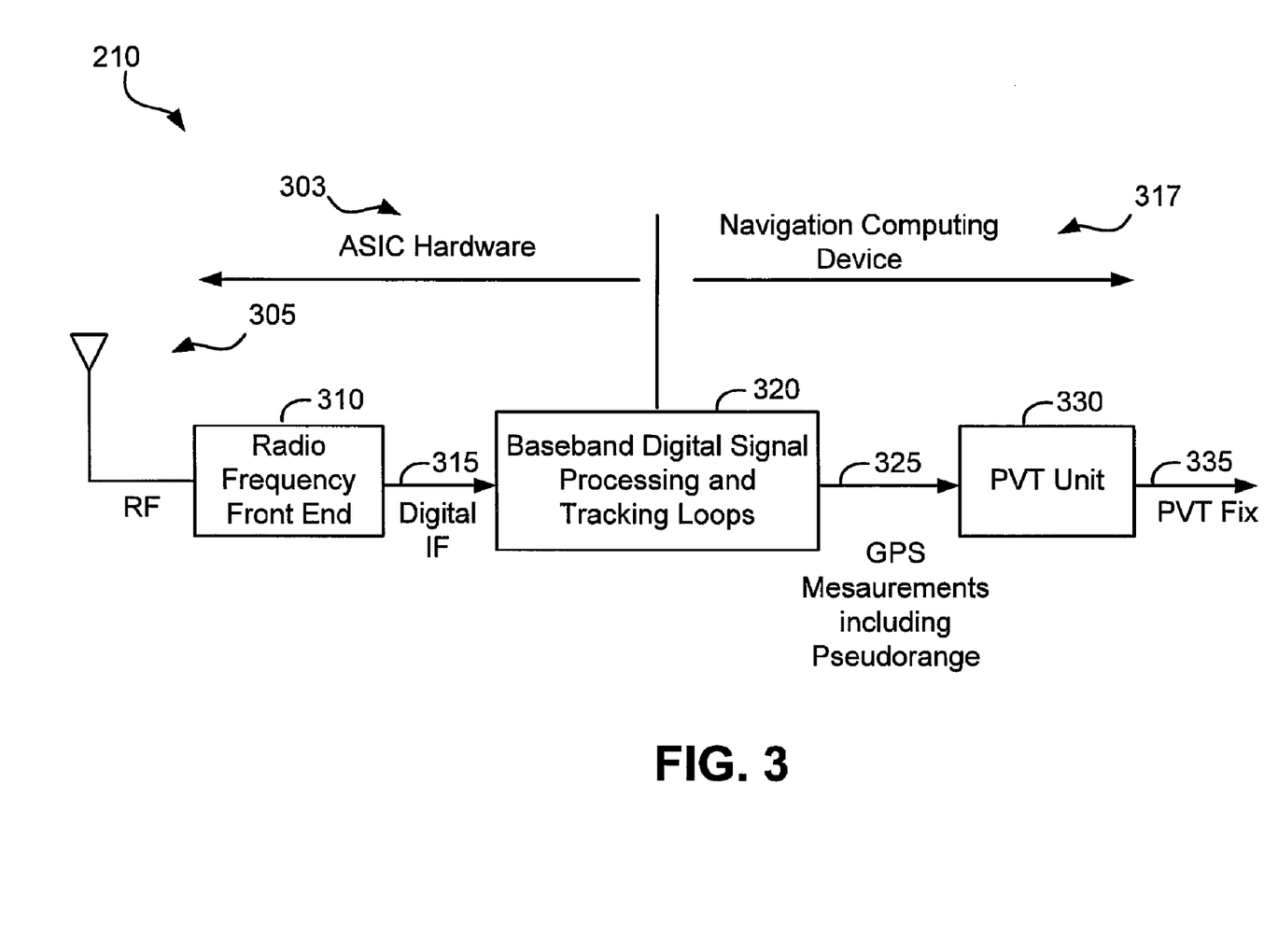
FIG. 3 is a block diagram that illustrates an embodiment of a GPS signal processing system, such as that shown in FIG. 2, which detects GPS measurement errors.

FIG. 3 is a block diagram that illustrates an embodiment of the GPS signal processing system, such as that shown in FIG. 2, which detects GPS measurement errors. The GPS signal processing system 210 can include, but is not limited to, an antenna 305, an application-specific integration circuit (ASIC) hardware 303 and a navigation computing device 317. The ASIC hardware 303 includes a radio frequency (RF) front end 310 and a baseband digital signal processing (DSP) 320. The navigation computing device 317 includes, but is not limited to, a position, velocity, and time (PVT) unit 330 and tracking loops unit 320 that controls the DSP. The navigation computing device 317 can be, but is not limited to, a microprocessor, among others.

The antenna 305 receives GPS signals as well as multipath signals, and sends the received signals to the RF front end unit 310 that down-converts, magnifies, filters, and digitizes the received signals into digital immediate frequency (IF) signals 315. Such digital IF signals 315 are input to the baseband DSP unit 320 that acquires and tracks the received signals and then generates GPS measurements 325 that includes pseudorange measurements according to the received GPS signals. In one embodiment, the baseband DSP 320 includes a carrier tracking loop (not shown) that computes delta range (DRs) and a code tracking loop (not shown) that computes pseudoranges (PRs).

The baseband DSP unit 320 delivers the generated GPS measurements 325 to the PVT unit 330 that computes a GPS solution or position fix 335 based on the generated GPS measurements 325. The PVT unit 330 includes, but is not limited to, a navigation algorithm (not shown), among others, which can include, but is not limited to, a Least-Square (LS) or Kalman filtering, among others. Alternatively or additionally, the baseband DSP unit 320 or the PVT unit 330 includes a consistency check algorithm 405 (FIG. 4) that can detect errors in the generated GPS measurements 325 before sending the generated GPS measurements 325 to the PVT unit 330 or calculating the position fix 335, respectively. Alternatively or additionally, the consistency check algorithm 405 can be independent and separate of the baseband DSP unit 320 and the PVT unit 330. One embodiment of the consistency check algorithm 405 is described in relation to FIG. 4. It should be noted that in a mobile-assisted (MS) AGPS system, the server 125 receives the GPS measurements from the navigation devices 115, calculates a position fix on the receiver's position, and sends the position fix to the navigation devices 115 or to other dispatchers.

Figure 4:
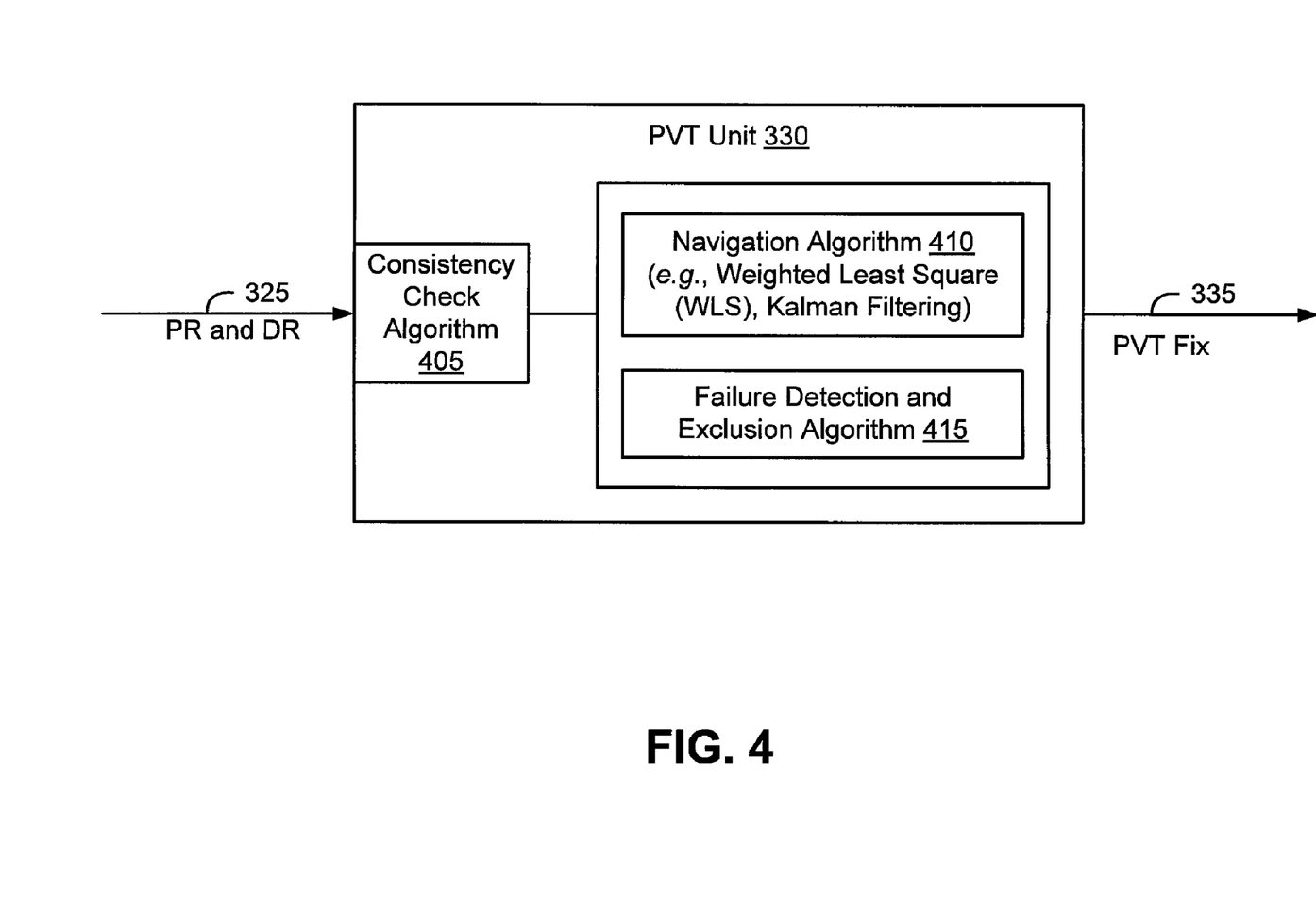
FIG. 4 is a block diagram that illustrates an embodiment of a position, velocity and time (PVT) unit, such as that shown in FIG. 3, which includes a consistency check algorithm for detecting GPS measurement errors.

FIG. 4 is a block diagram that illustrates an embodiment of a position, velocity and time (PVT) unit, such as that shown in FIG. 3, which includes a consistency check algorithm 405 for detecting GPS measurement errors. As mentioned above, the consistency check algorithm 405 can also be a part of the baseband DSP unit 320 or independent and separate of the baseband DSP unit 320 and the PVT unit 330. Alternatively or additionally, the consistency check algorithm 405 can also be regarded as a part of Failure Detection and Exclusion Algorithm 415.

GPS measurements, such as, pseudoranges (PRs) and delta ranges (DRs), among others, are sent to the consistency check algorithm 405, which determines mismatches between the respective PRs and DRs. If the mismatches are determined, the consistency check algorithm 405 sends an error message to the navigation algorithm 410 and/or failure detection and exclusion algorithm 415. If the mismatches are not determined, the consistency check algorithm 405 sends the GPS measurements to the navigation algorithm 410 that delivers a position fix. Failure detection and exclusion (FDE) algorithm 415 can have other methods to further independently detect and excludes failed pseudorange measurements. As illustrated in FIG. 4 and will be more clear in the detailed formulas later, the consistency check algorithm 405 detects GPS measurement errors independent of the navigation state, which generally includes three components of position, clock offset, and clock drift, among others. The consistency check algorithm 405 removes all or at least a portion of the erroneous measurement inputs into the navigation algorithm 410, which then can deliver bad position fixes. The consistency check algorithm 405 can function during normal operation whether or not the navigation state is valid and correct. However, many algorithms in the FDE algorithm 415 generally rely on the righteousness of the navigation state. If the navigation state is invalid or wrong, then the FDE algorithm 415 may not be effective in detecting measurement failures and/or rejecting good GPS measurements.

Figure 5:
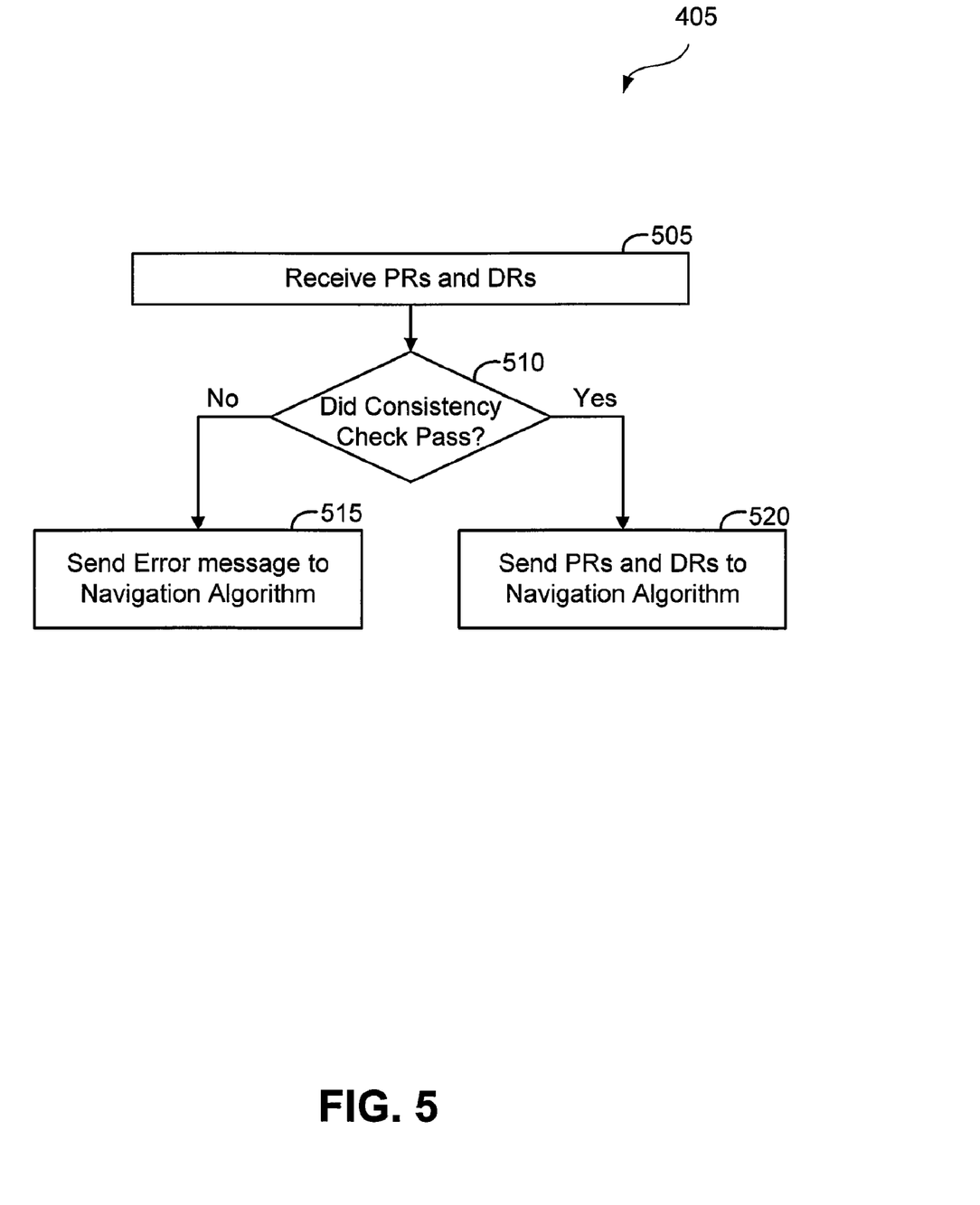
FIG. 5 is a flow diagram that illustrates an embodiment of the architecture, functionality, and/or operation of a consistency check algorithm, such as that shown in FIG. 4.

FIG. 5 is a flow diagram that illustrates an embodiment of the architecture, functionality, and/or operation of the consistency check algorithm 405, such as that shown in FIG. 4. Beginning with steps 505 and 510, the consistency check algorithm 405 receives pseudoranges (PRs) and delta ranges (DRs) and determines whether the PRs and DRs passed the consistency check, respectively. The consistency check is described in detail in relation to FIG. 6. If the PRs and DRS did not pass the consistency check, the consistency check algorithm 405 in step 515 sends error messages to the navigation algorithm 410. Alternatively or additionally, the consistency check algorithm 405 continues to send the GPS measurements along with the error messages or simply blocks the measurements to the navigation algorithm 410. If the PRs and DRs passed the consistency check, the consistency check algorithm 405 in step 520 sends the PRs and DRs to the navigation algorithm 410 to calculate a position fix. Alternatively or additionally, the consistency check algorithm 405 sends the PRs and DRs to the FDE algorithm 415 for more FDE checks.

Figure 6:
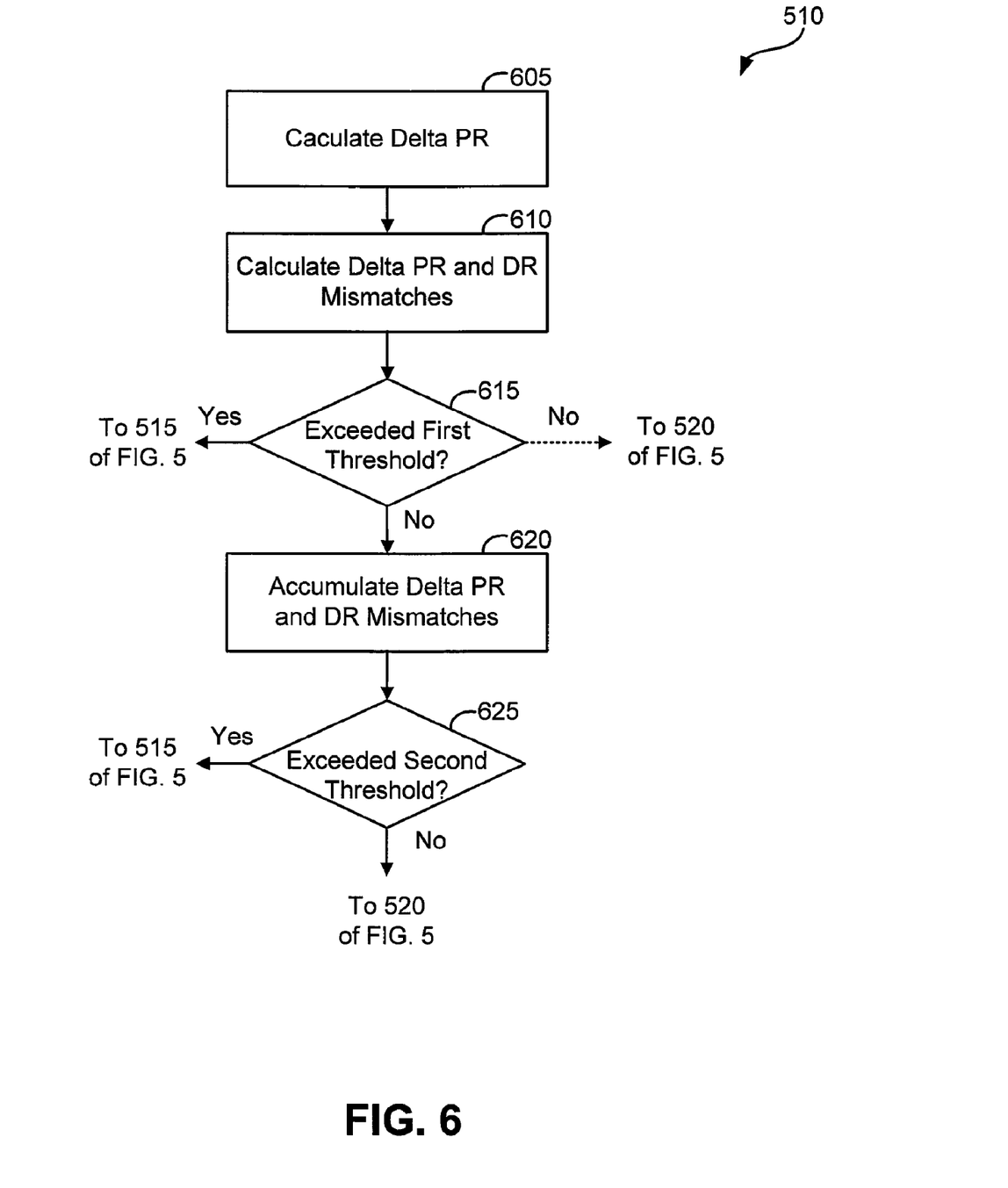
FIG. 6 is a flow diagram that illustrates an embodiment of the architecture, functionality, and/or operation for determining whether the pseudoranges (PRs) and delta ranges (DRs) passed a consistency check, such as that shown in step 510 of FIG. 5.

FIG. 6 is a flow diagram that illustrates another embodiment of the architecture, functionality, and/or operation for determining whether the pseudoranges (PRs) and delta ranges (DRs) passed the consistency check, such as that shown in step 510 of FIG. 5. In general, the relationship between PR and DR is expressed by $$pr_2 - pr_1 \approx (t_2 - t_1) \times dr_2 \qquad \text{(Eq. 1)}$$

where $pr_1$ and $pr_2$ are the noise-free pseudorange measurements for the same satellite 105, 110, 113, 114 delivered by a GPS receiver 210 at $t_1$ and $t_2$, respectively, and $dr_2$ is the corresponding noise-free DR measurement at $t_2$. An approximation equality used in the above formula is due to the code/carrier phase ionospheric divergence, among others. For example, the ionospheric delay makes PR measurements longer while the DR measurements shorter. It should be noted that equation 1 generally deals with range measurements, and is not involved in any estimated receiver position and other navigation states.

Figure 7:
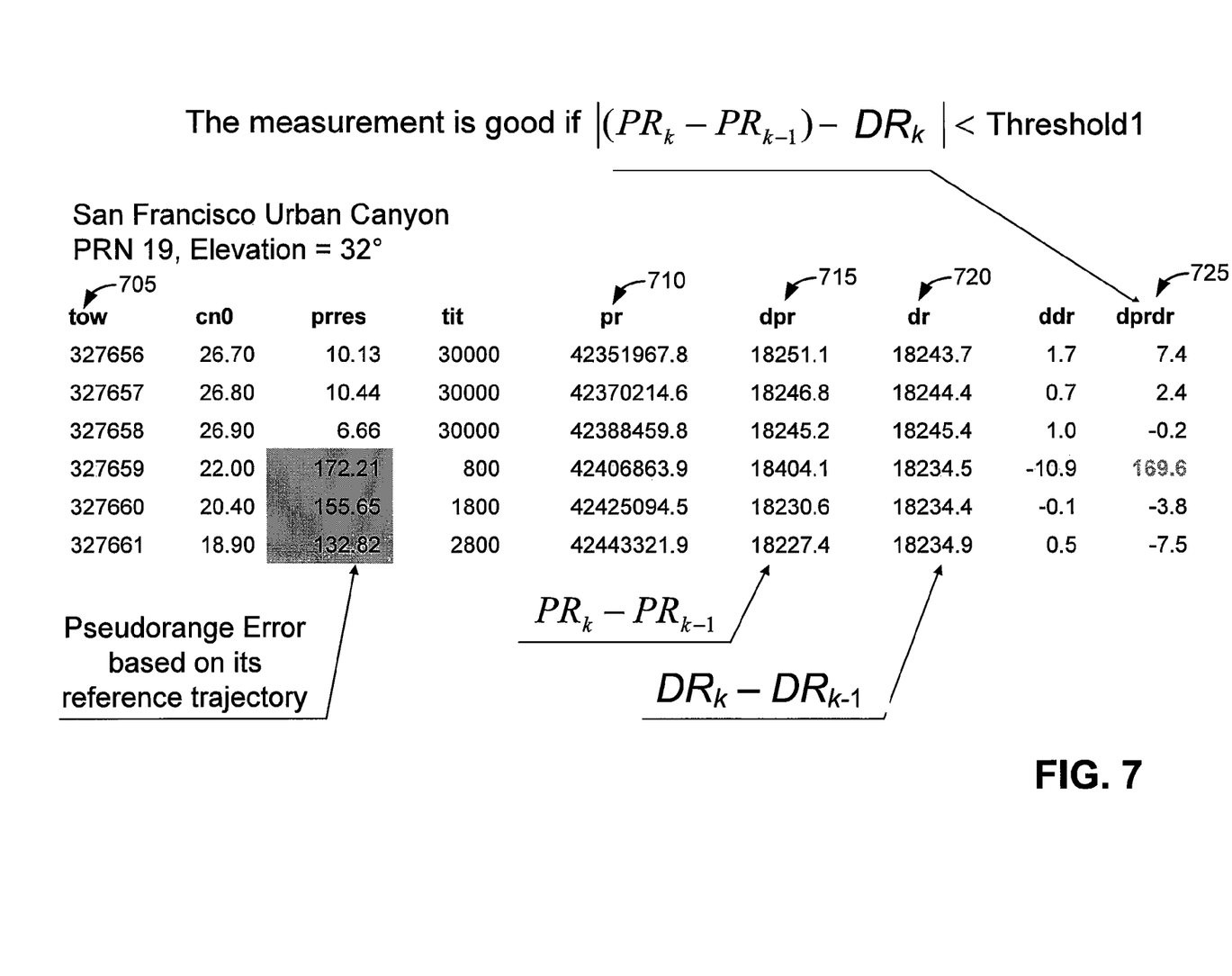
FIG. 7 is a diagram that illustrates a GPS measurement scenario in which a GPS measurement error is detected using steps 605 to 615 of FIG. 6.

Accordingly, the consistency check can be determined by the following:

$$|(pr_2 - pr_1) - dr_2| < \text{threshold}_1 \qquad \text{(Eq. 2)}$$

where $dr_2$ refers to the DR measurement multiplied by $(t_2-t_1)$ for simplicity reasons, though $(t_2-t_1)$ is very close to 1 seconds. This new definition of dr is also used in equations disclosed below. The $\text{threshold}_1$ generally refers to the limit of inconsistency between pr and dr measurements mainly due to normal GPS receiver noise. If a calculated inconsistency is larger than $\text{threshold}_1$, then typically both $pr_2$ and $dr_2$ may be detected as failed measurements; otherwise, both $pr_2$ and $dr_2$ are regarded as good ones. Therefore, as for many FDE algorithms, the value of $\text{threshold}_1$ cannot be too tight, which can lead to a high Pfa, and cannot be too loose, either, which can lead to a high Pmd. The value of $\text{threshold}_1$ can be determined typically based on statistics (e.g., 5 sigmas) of test measurement data under a clear sky and normal GPS receiver operation case. For example, $\text{threshold}_1$ can be set at approximately around 18 meters. It can further be a function of carrier-to-noise ratio (CN0). It should be noted that equation 2 is generally utilized to detect large pseudorange errors (also known as pseudorange spike errors), which further described in relation to FIG. 7.

Based on Equation 2, beginning with step 605, the consistency check algorithm 405 calculates delta PR by determining the difference between $pr_2$ and $pr_1$. In step 610, the consistency check algorithm 405 calculates delta PR and DR mismatches by determining the difference between delta PR and DR. In step 615, the consistency check algorithm 405 determines whether the calculated delta PR and DR mismatches have exceeded the threshold$_1$. If the threshold was exceeded, e.g., the inconsistency is larger than threshold$_1$, the sequence continues to step 515 of FIG. 5, which sends an error message to the navigation algorithm 410. Alternatively or additionally, if the threshold$_1$ was not exceeded, the sequence continues to step 520 of FIG. 5, which sends the PR and DR to the navigation algorithm 410 for delivering a position fix. A GPS measurement error scenario using steps 605 to 615 is described in relation to FIG. 7.

However, steps 605 to 615 may not be effective in detecting slowly-changing pseudorange errors, for example, from a line of sight-multipath (LOS-MP) signal or MP-only signal. Alternatively or additionally, steps 620 and 625 can be taken to detect the slowly-changing pseudorange errors. Accordingly, if the threshold$_1$ was not exceeded, the consistency check algorithm 405 in step 620 accumulates the delta PR and DR mismatch by, for example, the following:

$$|[(pr_k-pr_{k-1})-dr_k]+[(pr_{k-1}-pr_{k-2})-dr_{k-1}]|<\text{threshold}_2 \quad (\text{Eq. 3})$$

It should be noted that equation 3 can also be expressed as follows:

$$|[(pr_k-pr_{k-1})-dr_k]+\ldots+[(pr_{k-n}-pr_{k-n-1})-dr_{k-n}]|<\text{threshold}_{n+1} \quad (\text{Eq. 4})$$

It should be noted that equation 4 can also be expressed as follows:

$$|(pr_k-pr_{k-n-1})-(dr_k+\ldots+dr_{k-n})|<\text{threshold}_{n+1} \quad (\text{Eq. 5})$$

where n+1 is the number of seconds during which measurements are accumulated. The value n should not be too large mostly due to code-carrier ionospheric divergence effect. If the value of n is large, the detection delay may be longer than if the value of n is small. However, the large value of n causes the consistency check algorithm 405 to be more effective in detecting slow-changing errors. The values of threshold$_2$, threshold$_3$ and threshold$_{n+1}$ can be determined by the same way as determining threshold$_1$, e.g., based on statistics of testing data. Alternatively or additionally, all thresholds can be further tuned based on navigation performance test results. For example, 25 and 30 meters are some representative threshold values for threshold$_2$ and threshold$_3$.

In step 625, the consistency check algorithm 405 determines whether the accumulation of the difference between the respective calculated delta PRs and DRs has exceeded the threshold$_2$. If the threshold$_2$ was exceeded, the sequence continues to step 515 of FIG. 5, which sends an error message to the navigation algorithm 410. If the threshold$_2$ was not exceeded, the sequence continues to step 520 of FIG. 5, which sends the PR and DR to the navigation algorithm 410 for delivering a position fix. A GPS measurement error scenario using steps 620 to 625 is described in relation to FIG. 8.

Alternatively or additionally, if the threshold$_2$ was not exceeded, the accumulated PR and DR mismatches could further be determined whether the mismatches have exceeded threshold$_3$, threshold$_4$ and so on in a similar way as for threshold$_1$ and threshold$_2$. The PR and DR measurements that passed the consistency checks associated with all the thresholds are regarded as good measurements which are sent to the navigation algorithm 410 for a position fix.

FIG. 7 is a diagram that illustrates a GPS measurement scenario in which a GPS spike measurement error is detected using steps 605 to 615 of FIG. 6. The GPS measurement error scenario generally occurs in urban canyon environments, and spike errors could happen when the receiver tracking loops, originally tracking a LOS signal, suddenly turn to track its long-delay multipath signal for, for example, signal blockage reason. The GPS signals are tracked according to the current Week Number and time of week (TOW) GPS time 705. The TOW refers to the number of seconds into the week ranging from 0 second to 604800 seconds and is counted from midnight Saturday/Sunday on the GPS time scale.

In this example, during the seven seconds from 327656 seconds to 327661 seconds, a pseudorange (PR) spike error occurred at 327659 seconds while the receiver continuously tracked the signal. In order to identify the effectiveness of the inconsistency check, pseudorange errors, for this example, were calculated based on the receiver's truth trajectory from another reference navigational system, not from the GPS receiver itself. A delta PR is calculated to be 18404.1 meters at 327659 seconds using PRs 710 at 327659 seconds and 327658 seconds. The measured delta range (DR) 720 was 18234.5 meters and a delta PR and DR mismatch 725 at 327659 seconds is calculated to be 169.6 meters using delta PR 715 and DR 720 at 327659 seconds. The calculated delta PR and DR mismatch is compared to a threshold to determine whether the consistency check between the PR and DR passed. It should be noted that the spike errors, such as that shown in FIG. 7, can also be easily detected by other FED algorithms 415 if the navigation state is reasonably valid and correct.

Figure 8:
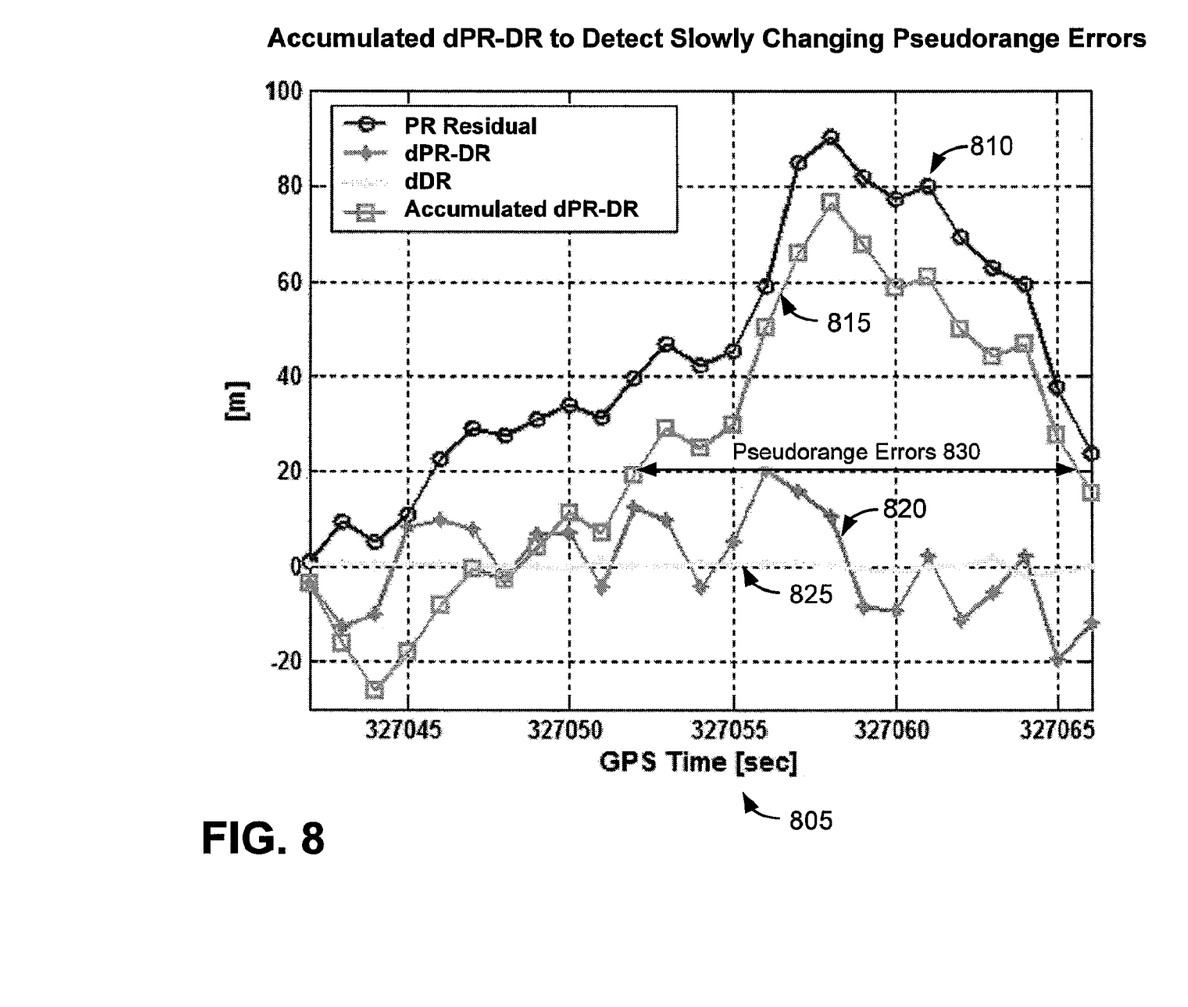
FIG. 8 is a diagram that illustrates another GPS measurement scenario in which slow-changing GPS measurement errors are detected using steps 620 to 625 of FIG. 6.

FIG. 8 is a diagram that illustrates a GPS measurement scenario in which slow-changing GPS measurement errors are detected using steps 620 to 625 of FIG. 6. The GPS signals are tracked according to time of week (TOW) GPS time 805. In this example, GPS measurements were examined for the twenty-four seconds from 327042 seconds to 327066 seconds. Line 810 refers to the PR residual based on received GPS signals from the signal sources 105, 110, 113, 114 (FIG. 1). In this example, these PR residuals were calculated not based on receiver's position fix, but based on its truth trajectory from a reference navigational system. Line 820 refers to delta PR and DR mismatches and line 825 refers to delta DR. Though pseudorange (PR) errors 830 occurred from 327052 seconds to 327065 seconds, PR-DR mismatches in Line 820 are not well beyond threshold, e.g., 20 meters, which illustrates that the consistency check associated with threshold$_1$ could cause misdetections in detecting slow-changing errors.

In order to illustrate the effect of slow-changing errors, Line 815 is the cumulative sum (CUSUM) of PR-DR mismatches, e.g., the sum of previous PR-DR mismatches till the current epoch. Though the consistency check associated with threshold$_1$ may fail to detect the slow-changing errors, the CUSUM can still reach to a very large value and thus the underlying slow-changing error can be easily detected. The accumulated PR-DR mismatch methods that use Eqs. (3) and (4) are variations of the CUSUM, which could improve the CUSUM method to detect more quickly.

Figure 9:
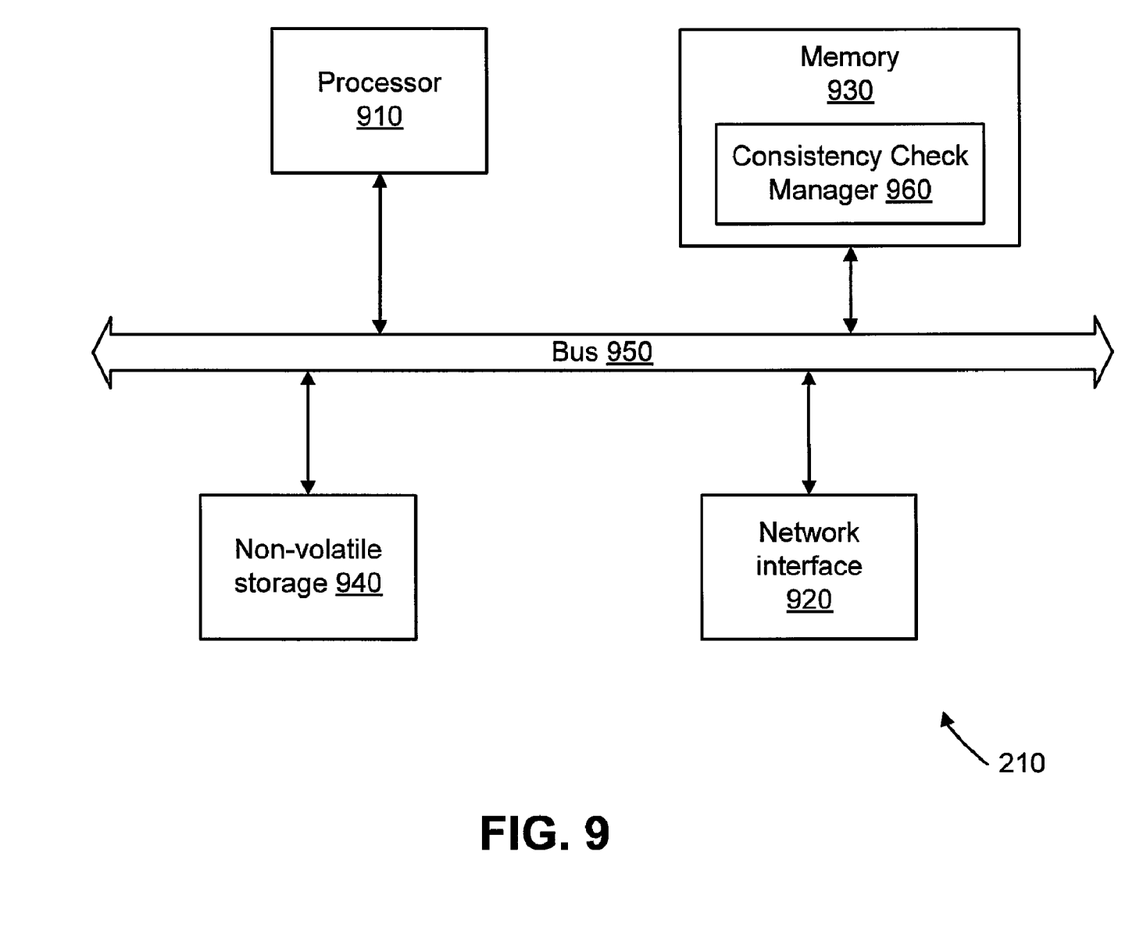
FIG. 9 is a block diagram that illustrates an embodiment of a GPS signal process system, such as that shown in FIGS. 2 and 3.

FIG. 9 is a block diagram that illustrates an embodiment of the GPS signal process system 210, such as that shown in FIGS. 2 and 3. The GPS signal process system 210 includes a processor 910, a network interface 920, memory 930, and non-volatile storage 940. Examples of non-volatile storage include, for example, a hard disk, flash RAM, flash ROM, EEPROM, etc. These components are coupled via a bus 950. The memory 930 includes a consistency check manager 960 that facilitates detecting GPS measurement errors based on the calculated pseudoranges and delta ranges. Operations of the consistency check manager 960 can be described in detail in relation to FIGS. 5 and 6. The memory 930 contains instructions which, when executed by the processor 910, implement at least a portion of the methods and systems disclosed herein, particularly the consistency check manager 960. Omitted from FIG. 9 are a number of conventional components, known to those skilled in the art that are unnecessary to explain the operation of the device 210.

The systems and methods disclosed herein can be implemented in software, hardware, or a combination thereof. In some embodiments, the system and/or method is implemented in software that is stored in a memory and that is executed by a suitable microprocessor (μP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

Therefore, having thus described the disclosure, at least the following is claimed:

1. A system for detecting global positioning system (GPS) measurement errors comprising:
 a navigation device configured to receive GPS signals from signal sources, the navigation device being configured to calculate pseudoranges (PRs) and delta ranges (DRs) based on the received GPS signals, the navigation device including a consistency check algorithm configured to:
 calculate delta PRs;
 determine whether at least one difference between respective calculated delta PRs and DRs exceeds a first threshold; and
 in response to determining that the at least one difference does not exceed the first threshold, accumulate the differences between the respective calculated delta PRs and DRs, determine whether the accumulation of the differences between the respective calculated delta PRs and DRs exceeds a second threshold, and indicate that an error exists in the respective calculated PRs and DRs if the accumulation of the differences exceeds the second threshold.

2. The system as defined in claim 1, wherein the consistency check algorithm is further configured to send an error message to a navigation algorithm responsive to determining that the at least one of the mismatches exceeds the first threshold.

3. The system as defined in claim 1, wherein the consistency check algorithm is further configured to send the calculated PR and DR to a navigation algorithm responsive to determining that the at least one of the mismatches does not exceed the first threshold.

4. A method for measuring global positioning system (GPS) errors comprising:
 receiving GPS signals from signal sources;
 calculating pseudoranges (PR) and delta ranges (DR) based on the received GPS signals;
 calculating delta PRs;
 determining whether mismatches exist between respective calculated delta PRs and DRs based on a first threshold; and
 in response to determining that one or more mismatches exist, accumulating delta PR and DR mismatches and performing a consistency check involving the accumulated delta PR and DR mismatches based on a second threshold.

5. The method as defined in claim 4, further comprising:
 determining whether at least one of the mismatches between the respective calculated delta PRs and DRs exceeds the first threshold; and
 responsive to determining that the at least one of the differences exceeds the first threshold, indicating that an error exists in the respective calculated delta PRs and DRs.

6. The method as defined in claim 4, further comprising sending an error message to a navigation algorithm responsive to determining that the at least one of the mismatches exceeds the first threshold.

7. The method as defined in claim 4, further comprising sending the calculated PR and DR to a navigation algorithm responsive to determining that the at least one of the mismatches does not exceed the first threshold.

8. A global positioning system (GPS) receiver comprising:
an antenna that receives GPS signals from signal sources;
a digital signal processing (DSP) configured to receive the GPS signals from the antenna, the DSP being configured to calculate pseudoranges (PRs) and delta ranges (DRs) based on the received GPS signals; and
a consistency check algorithm configured to:
determine whether one or more mismatches exist between respective calculated delta PRs and DRs, and
in response to determining that one or more mismatches exist, accumulate delta PR and DR mismatches and perform a consistency check involving the accumulated delta PR and DR mismatches based on a threshold.

9. The GPS receiver as defined in claim 8, wherein the consistency check algorithm is further configured to send the calculated PR and DR to a navigation algorithm responsive to determining that the at least one of the mismatches does not exceed a mismatch threshold.

10. A global positioning system (GPS) receiver comprising:
an antenna that receives GPS signals from signal sources;
a digital signal processing (DSP) that receives the GPS signals from the antenna, the DSP being configured to calculate pseudoranges (PRs) and delta ranges (DRs) based on the received GPS signals; and
a consistency check algorithm that is configured to:
calculate delta PRs;
accumulate differences between respective calculated delta PRs and DRs based on whether one or more mismatches exist between the respective calculated delta PRs and DRs,
determine whether the accumulation of the differences between respective calculated delta PRs and DRs exceeds a threshold; and
responsive to determining that the accumulation of the differences exceeds the threshold, indicate that an error exists in the respective calculated PRs and DRs.

11. The system as defined in claim 1, wherein the first threshold is determined based on statistics relating to test measurement data for normal GPS receiver operation.

12. The system as defined in claim 11, wherein the first threshold is a function of carrier-to-noise ratio (CN0).

13. The system as defined in claim 1, wherein accumulating the differences between the respective calculated delta PRs and DRs is performed based on:

$$|(pr_k - pr_{k-n-1}) - (dr_k + \ldots + dr_{k-n})| < \text{threshold}_{n+1},$$

where n+1 represents a number of seconds during which measurements are accumulated.

* * * * *